(12) United States Patent
Basha

(10) Patent No.: US 12,133,145 B1
(45) Date of Patent: Oct. 29, 2024

(54) PHYSICALLY ATTACHABLE WIRELESS APPARATUS

(71) Applicant: Juniper Networks, Inc., Sunnyvale, CA (US)

(72) Inventor: Syed Irfan Chanth Basha, Acton, MA (US)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

(21) Appl. No.: 18/173,454

(22) Filed: Feb. 23, 2023

Related U.S. Application Data

(63) Continuation of application No. 16/804,756, filed on Feb. 28, 2020, now Pat. No. 11,611,852.

(51) Int. Cl.
*G06F 1/16* (2006.01)
*G06F 13/40* (2006.01)
*H04W 4/06* (2009.01)
*H04W 4/80* (2018.01)
*H04W 76/10* (2018.01)

(52) U.S. Cl.
CPC .............. *H04W 4/06* (2013.01); *H04W 4/80* (2018.02); *H04W 76/10* (2018.02)

(58) Field of Classification Search
None
See application file for complete search history.

(56) References Cited

U.S. PATENT DOCUMENTS

| | | | | |
|---|---|---|---|---|
| 8,155,336 B2 * | 4/2012 | Tang | ..................... | H04R 1/1041 381/74 |
| 8,942,365 B2 * | 1/2015 | Daye | ..................... | H04M 3/382 379/202.01 |
| 9,131,335 B2 * | 9/2015 | Huttunen | ................ | H04W 4/80 |
| 9,143,590 B2 * | 9/2015 | Goldman | ................ | H04M 1/04 |
| 9,479,626 B2 * | 10/2016 | Frandsen | ............. | H04W 52/38 |
| 9,665,525 B2 * | 5/2017 | Soffer | ................. | G06F 13/4221 |
| 10,051,460 B2 * | 8/2018 | Bran | ....................... | H04W 4/80 |
| 10,425,536 B2 * | 9/2019 | Paolini-Subramanya | .................... | H04L 12/10 |

(Continued)

OTHER PUBLICATIONS

Notice of Allowance from U.S. Appl. No. 16/804,756 dated Nov. 25, 2022, 6 pp.

(Continued)

*Primary Examiner* — Tuan A Tran
(74) *Attorney, Agent, or Firm* — Shumaker & Sieffert, P.A.

(57) ABSTRACT

Disclosed is a modular teleconference system that provides the convenience of a wireless headset for teleconference participants and the determinism associated with a physical connection between the headset and teleconferencing system. Some embodiments include a teleconference adaptor or mini-hub-device that is able to maintain a wireless connection even when disconnected from a teleconference hub device. The hub-device provides one or more cradles, each of which provides a physical connection to a mini hub. When a mini hub is placed in a cradle of a hub-device, the audio channels of the wireless headset are connected to audio channels of the hub-device. The hub-device in turn is connected to a teleconferencing application running on a computing device, such as a personal computer. For each mini hub placed in a cradle of the hub-device, audio from the corresponding wireless headset is integrated with the teleconference audio channel.

20 Claims, 9 Drawing Sheets

(56) References Cited

U.S. PATENT DOCUMENTS

| | | | | |
|---|---|---|---|---|
| 2007/0002533 A1* | 1/2007 | Kogan | ............... | H02J 7/0027 |
| | | | | 361/679.41 |
| 2007/0101039 A1* | 5/2007 | Rutledge | ............... | G06F 1/1632 |
| | | | | 710/303 |
| 2008/0080703 A1* | 4/2008 | Penning | ............ | H04M 1/72502 |
| | | | | 379/428.02 |
| 2011/0136541 A1* | 6/2011 | Chang | ............... | H04M 1/72409 |
| | | | | 455/558 |
| 2014/0140501 A1* | 5/2014 | Goldman | .......... | H04M 1/72412 |
| | | | | 379/454 |
| 2014/0295758 A1* | 10/2014 | Pedersen | ................ | H04W 4/80 |
| | | | | 455/41.2 |
| 2019/0028149 A1* | 1/2019 | Pifferi | ................. | H04B 5/0031 |

OTHER PUBLICATIONS

Office Action from U.S. Appl. No. 16/804,756, dated Dec. 9, 2021, 12 pp.
Response to Office Action dated Dec. 9, 2021, from U.S. Appl. No. 16/804,756, filed Mar. 9, 2022, 12 pp.
Response to Office Action dated Dec. 9, 2021 from U.S. Appl. No. 16/804,756, filed Aug. 5, 2022, 13 pp.

* cited by examiner

PHYSICALLY ATTACHABLE WIRELESS APPARATUS

This application is a continuation of U.S. patent application Ser. No. 16/804,756, filed 28 Feb. 2020, the entire contents of which is incorporated herein by reference.

FIELD

The present disclosure relates to the field of wireless communication. In particular, the disclosure contemplates obtaining advantages of previous wired technology lost when utilizing a traditional wireless device.

BACKGROUND

Teleconferencing is a function critical to the success of many businesses. Teleconferencing is utilized in a variety of business environments, including sales, customer support, intra-organization communication, negotiations, and many others. When analog technology was prevalent, parties to a conference would physically connect to a circuit which carried audio signals for the conference. This physical connection could occur at the telephone switch, or near the party, for example, at a telephone handset.

As teleconferencing moved to rely primarily on digital technology, hardware based solutions were introduced and provided an interface between parties to a call and the digital backbone. Later, the teleconferencing function was subsumed by software in many solutions. Additional flexibility for parties to a teleconference arrived when wireless headsets developed. Utilizing wireless technologies such as Bluetooth, wireless headsets freed users from the constraints of being proximate to their hardware device that provided a connection to the digital teleconference. In these environments, joining or leaving a teleconference typically included selecting a uniform resource locator (URL) identifying a teleconferencing resource. Leaving the teleconference typically included interacting with a user interface of a teleconference application, for example, to select a control requesting disconnection from the teleconference.

DETAILED DESCRIPTION

Figure 1:
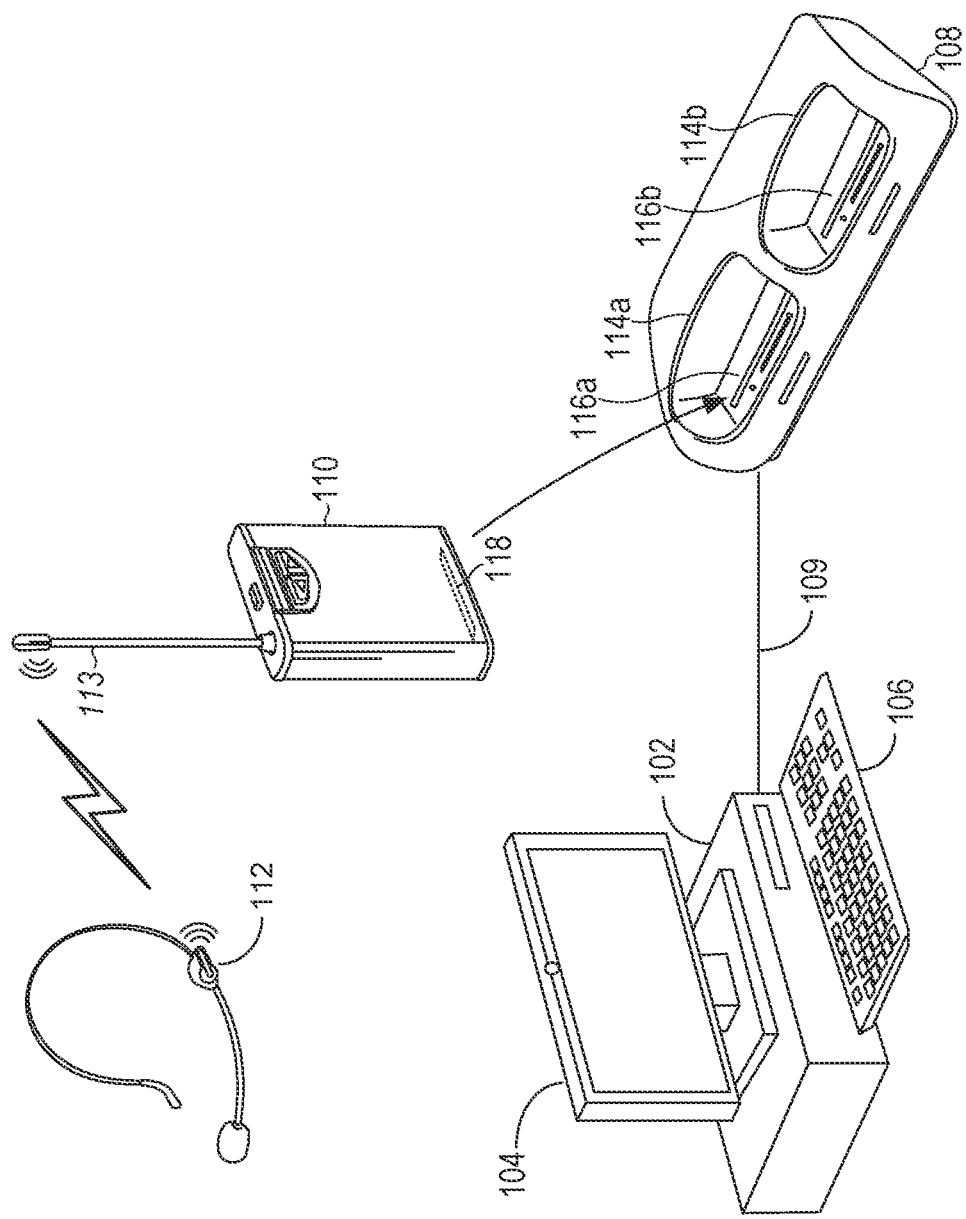
FIG. 1 is an overview diagram of a teleconferencing client utilizing one or more embodiments of the present disclosure.

As discussed above, the advent of wireless headsets freed teleconference participants from at least some constraints imposed by the hardware device providing a connection to a teleconference. For example, after a teleconference participant interacts with their computing device to, for example, join a teleconference, they are able to move around in a proximity of their computing device, at least within the wireless range of their headset. While the wireless headset presents several advantages in the context of a participant in a single teleconference, some challenges arise when the user seeks to dynamically join and/or leave multiple teleconferences over a relatively short period of time.

In one example use case, a teleconferencing center includes at least tens of teleconference operators, each individually engaged in a separate teleconference with a different contact. The contact may be a prospective customer (in a sales context), a current customer (in a customer support context), or some other contact. A need may arise as these teleconferences proceed for a supervisor or manager of the teleconferencing center to dynamically join one or more of these teleconferences. Some teleconferencing centers utilize advanced teleconferencing software solutions, that allow a teleconference operator to dynamically request, via the software, the supervisor to join a call. The supervisor receives a notification via their computing device (or perhaps via their smart watch if they have moved away from their computing device) indicating the request to join. In response, the supervisor provides input to the teleconferencing software indicating his acceptance of the join request, and the supervisor is then connected (logically, via software) to the audio stream for the call. Thus, in this environment, users are able to dynamically join or leave select teleconferences completely via the advanced software application, which typically supports multiple teleconferences and multiple users simultaneously.

In other environments, teleconference operators may rely on less sophisticated teleconferencing software. For example, some teleconferencing environments utilize single user teleconferencing applications. To join a teleconference using a single user application, typically a link to the teleconference is distributed to attendees. Selecting the link rules the single user application and causes it to join the teleconference. Thus, multiple participants are supported by the distribution of links to the multiple participants. The joining and leaving of the teleconference is performed via an interface on the computing device running the teleconferencing application.

Disclosed are embodiments for facilitating teleconference roaming using a wireless headset. Previous generations of teleconferencing equipment, and in particular those based on analog technology, provided a wired connection between a teleconference participant's headset and a telephone apparatus that interfaced with an analog telephony network. If an additional participant sought to join the teleconference, some telephone apparatus were equipped with one or more additional headset jacks. The additional participant would plug their headset into one of the additional headset jacks and be immediately connected to the teleconference. For example, the newly connected headset would immediately begin to receive signals defining audio for the teleconference, and the newly connected headsets microphone would be immediately able to inject audio signals into the teleconference audio signal.

More recently, teleconferences rely on digital technology, including the use of a computing device, such as a personal computer or laptop. For example, a digital telephony application is installed on the computing device and facilitates participation of an operator of the computing device in a digital teleconference. The operator of the computing device may utilize a wireless headset, such as a Bluetooth headset, for communication during the teleconference. The wireless headset is configured to communicate with the computing device. The headset is configured to operate via the computing devices audio channels, including an audio output channel and a microphone channel. For example, if the wireless headset utilizes the Bluetooth protocol, a pairing process between the computing device and the wireless headset establishes a wireless connection between the headset and the computer's microphone and audio channels, typically before the digital teleconference begins. The digital telephony application is also configured to output audio of the teleconference to the computing devices audio output channel and receive input for the teleconference audio via the computing device's microphone channel.

However, the requirement to configure or "pair" a wireless headset with the computing device presents an impediment to teleconference participants dynamically joining or leaving a digital conference via the computing device and digital telephone application. For example, a call center may include several agents, each engaged in a separate teleconference with clients, customers, or other parties. Each of agents is connected with a respective teleconference via a separate software application running on their respective computing device, such as desktop computer. The software applications of the multiple agents do not generally interact, in that each instance of the software application does not support multiple simultaneous teleconferences.

In some environments, a supervisor monitors operators and is asked to join particular teleconferences, for example, when an operator needs assistance. However, when the supervisor relies on a wireless headset, it can be difficult for the supervisor to easily join the teleconference that is occurring via the computing device and the dedicated digital telephony application. For example, pairing the supervisor's headset with the operator's computing device presents a time-consuming distraction that does not provide a satisfactory experience for the client, operator, or supervisor. Furthermore, maintaining preexisting paired connections with each operator's computing device is problematic, as the computing devices of multiple operators are located within a close enough proximity such that the headset could be within a range of multiple computing devices simultaneously, presenting ambiguity as to which computing device the headset should be paired with.

To solve this technical problem presented via the use of a wireless headset in close proximity to one or more computing devices hosting separate teleconferences, the disclosed embodiments provide for a teleconference hub or hub-device to facilitate dynamic entry and exit of a participant to a teleconference occurring via a particular computing device. The hub-device is either physically or wirelessly connected to a computing device's audio and microphone channels. The hub-device also includes one or more physical cradles, which function as physical interfaces with one or more corresponding "mini-hub" or teleconference adapter devices. The physical interfaces in some embodiments utilize near field communication (NFC), and in some of these embodiments, near-field magnetic induction (NFMI) communication is utilized. In some embodiments, the physical interface is an electric contact based interface that includes two electrical connections (one from each of the mini-hub and hub device) that make physical contact and allow electrical signaling via physical flow of electrons between the two physical contacts.

The mini-hub-devices are self-powered, and are thus capable of maintaining a wireless connection with a wireless headset, even when a mini-hub is disconnected from any hub-device. Upon physically connecting with a hub-device, for example, via an inductive interface, near field communication interface, or an interface that includes electrical contacts on the two devices that physically touch each other, the audio and microphone channels of the mini-hub connect with the audio and microphone channels of the hub, which in turn, as discussed above, are logically connected to the audio and microphone channels of the computing device itself. Some embodiments of the hub-device provide for multiple mini-hubs to be simultaneously connected, and thus multiple wireless headsets to be simultaneously joined with at least audio and microphone channels of the computing device. Some embodiments of the hub device and mini-hub deice also provide for a video stream to be communicated bi-directionally between the computing device and each of the mini-hubs. Multimedia data or media data as described herein refers to one or more of audio data, video data, image data, annotation data, or other data communicated during a digital teleconference session.

The hub and mini-hub-devices allow teleconference participants to receive advantages of both a wireless and a wired connected. Once the mini-hub is physically connected to a particular hub-device, a logical and physical communication channel is provided between the headset paired to the mini-hub and the computing device's audio channels. While this physical connection is maintained, an operator wearing the headset is able to move freely via their wireless connection to the mini-hub. When the operator seeks to exit the teleconference hosted by the computing device, the operator can simply detach the mini-hub from the hub and carry the mini-hub with them, perhaps attaching their mini-hub to a second hub-device and thus joining a second teleconference.

FIG. 1 is an overview diagram of a teleconferencing client utilizing one or more embodiments of the present disclosure. FIG. 1 shows a computing device 102, connected to an electronic display 104 and input device 106. A hub-device 108 is connected to the computing device 102 via a connection 109. The connection 109 is a physical connection in some embodiments. Example physical connections include connections utilizing a universal serial bus interface (USB), firewire, Ethernet, HDMI, or other hardware connect technologies. In some embodiments, the connection 109 is a wireless network connection. A mini-hub-device 110 maintains a wireless connection to a wireless headset 112 via an antenna 113. The hub-device 108 is shown to be configured with two cradles 114a and 114b. Each cradle 114a-b is equipped with an inductive coupler 116a-b respectively. The mini-hub 110 is also shown with an inductive coupler 118. When the mini-hub 110 is placed in one of the cradles 114a or 114b, the inductive coupler 118 couples with one of the inductive couplers 116a or 116b. The inductive coupling created by the inductive couplers 118 and 116a or 116b facilitates digital and/or analog communication between the mini-hub 110 and hub-device 108. For example, an audio channel of the mini-hub is connected to an audio channel of the hub via the coupling in some embodiments. Similarly, a microphone channel of the mini-hub 110 is connected to a microphone channel of the hub via the coupling in some embodiments. In some embodiments, the inductive coupling between the inductive couplers 118 and 116a or 116b provides for electrical power transfer from the hub-device 108 to the mini-hub 110. For example, the power transfer facilitates recharging of a battery included in the mini-hub 110 in some embodiments (battery not shown in FIG. 1).

Figure 2:
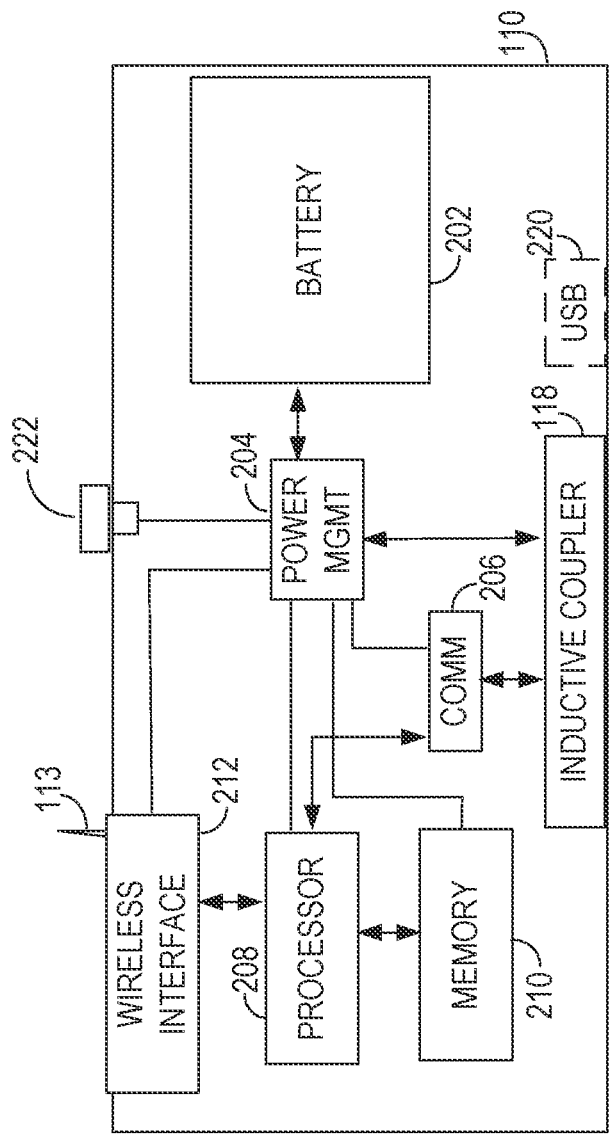
FIG. 2 is a block diagram of one embodiment of a mini hub.

FIG. 2 is a block diagram of one embodiment of a teleconference adapter or mini hub. In at least some embodiments, the mini-hub is designed to be a hand-held device. In some embodiments, the mini-hub includes a belt clip or other fastening device that allows the mini-hub to be attached to an article of clothing. The mini-hub 110 is shown including the inductive coupler 118 as discussed above with respect to FIG. 1. The mini hub also includes a battery 202, power management hardware 204, communications hardware 206, a hardware processor 208, electronic memory 210, a wireless interface 212, and the antenna 113.

FIG. 2 also shows that the mini-hub is equipped with a wired connector 220 in some embodiments. The wired connector 220 is a USB connector in some embodiments. In some embodiments that include the wired connector 220, the inductive coupler 118 is not included in the mini-hub 110. The wired connector 220 provides a wired physical connection to a hub (e.g. hub-device 108) as an alternative to a more expensive inductive coupling in some embodiments. The mini-hub 110 is also equipped with at least one switch 222. In some embodiments, the switch is configured to toggle the mini-hub between a power-on and a power-off state. In some embodiments, the example mini-hub 110 includes a second switch (not shown). The second switch is configured, in some embodiments, to initiate a pairing process. For example, the pair switch causes the processor 208 and/or wireless interface 212 to advertise its availability to pair with other wireless devices and/or initiate a pairing process with another wireless device. In some embodiments, the mini-hub 110 (e.g via processor 208 and wireless interface 212) implements an audio gateway role in a Bluetooth communication protocol.

The mini-hub 110 is configured to provide a wireless connection to a headset (e.g. 112), and to provide that connection even when the mini-hub is not physically connected to a hub-device via either an inductive (e.g. via inductive coupler 118) or wired (e.g. via wired connector 220) connection. The mini-hub 110 is able to maintain the wireless connection to the headset by providing power to one or more of the memory 210, wireless interface 212 via the battery 202. For example, power management hardware 204 manages energy stored in the battery and energy provided by the inductive coupler 118 and/or wired connector 220, to supply continuous power to the one or more of the hardware processor 208, memory 210, and wireless interface 212. In some embodiments, the processor 208 implements a "media gateway" role as defined by the Bluetooth specification, while a headset to which the mini-hub is connected implements the "hands-free unit" role.

Figure 3:
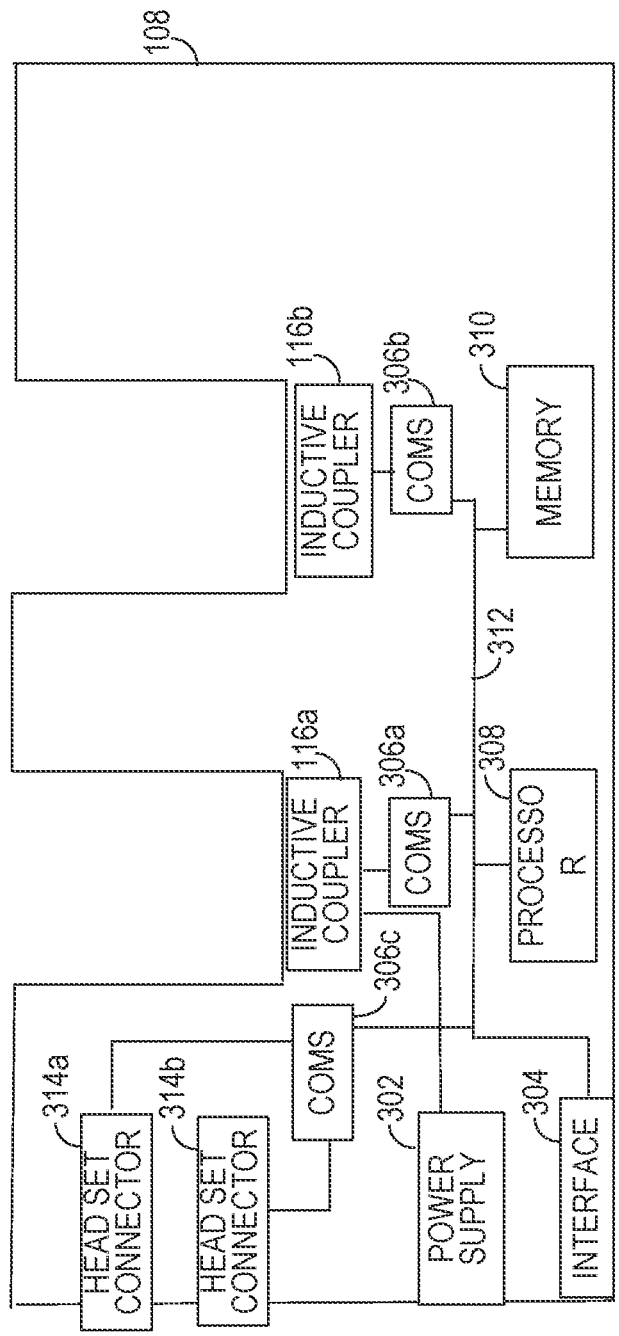
FIG. 3 is a block diagram of one embodiment of a hub-device.

FIG. 3 is a block diagram of one embodiment of a teleconference hub-device. The hub-device 108 includes the inductive couplers 116a-b discussed above with respect to FIG. 1 and FIG. 2. hub-device 108 is further shown to include a power supply 302, interface 304, communication processors 306a and 306b, hardware processor 308, and memory 310. These components are operably connected via a bus 312. The example hub-device 108 is powered via wall power in some embodiments. In some embodiments, an AC adaptor is provided in line between the wall power outlet and the power supply 302.

The communication processors 306a-b are operably connected to the inductive couplers 116a-b respectively and to the bus 312. The communication processors 306a-b provide for the passing of data between the hardware processor 308 and a mini-hub within a physical proximity of the inductive coupler or inductive interface. The hardware processor 308 is configured to interface with a computing device (e.g. 102) via the interface 304. The interface 304 is typically a wired interface, such as a USB or an IEEE 1394 ("Firewire") interface, but is a wireless interface (e.g. WiFi or cellular) in some embodiments. For example, the hardware processor 308 is configured to read data from an audio channel of the computing device via the interface 304. The hardware processor 308 is further configured to write audio information to the audio channel of the computing device via the interface 304.

In some embodiments, the interface 304 is a wireless interface, and functions to provide a capability to pair the hub-device 108 with a wireless headset. For example, in some embodiments, the hub-device 108 (e.g. via processor 308) implements a Bluetooth "audio gateway" role via a wireless interface, such as the interface 304. In these embodiments, the hub-device 108 (e.g. via at least the processor 308) is configured to multiplex multi-media data received via the paired headset with other media data received and/or transmitted to the computing device and/or one or more mini-hubs via the physical interfaces (such as those provided by the inductive couplers 116a-b in the embodiment illustrated in FIG. 3).

In some embodiments, a hub-device implements additional interfaces from those shown in FIG. 3. For example, while the interface 304 is shown and described as being either a wireless or wired interface, some embodiments implement two or more interfaces, and include both wired and wireless interfaces. For example, some embodiments of a hub-device provide a wired interface (e.g. USB) for communication with a computing device, and a wireless interface that provides pairing capability to a wireless headset.

The hub-device 108 is also shown to include headset connectors 314a-b. The headset connectors 314a-b are operably connected to a communication processor 306c.

The hardware processor 308 is configured to read audio and/or video information from data received via the inductive coupler 116a. For example, in some embodiments, a mini-hub inductively coupled to the inductive coupler 116a, for example, provides media data (e.g. audio data generated by a microphone of a wireless headset) to the processor 308. The processor 308 then provides the media data, or data derived from the media data, to the computing device's audio channel via the interface 304. The processor 308 is further configured to multiplex audio information received from multiple mini-hubs, via, for example, multiple inductive couplers or inductive interfaces such as the inductive couplers 116a and 116b, and write the multiplexed audio information to the audio channel of the computing device via the interface 304. Similarly, the processor 308 is configured to receive media data from the computing device via the interface 304 and write the media data to each of the indictive coupler's 116a-b in order to provide a signal to multiple mini-hubs inductively coupled to the hub-device 108.

The processor 308 is further configured to read media data from one or more wired headsets connected to one or more of the headset connectors 31a-b. The communication processor 306c converts analog audio information received from the headset connectors 314a-b, performs analog to digital conversion, and transmits the digitized data on the bus 312. The processor 308 reads the digitized media data provided by the communication processor 306c, and writes the audio data to the audio channel of the computing device (102) connected via the interface 304. Similarly, the processor 308 is configured to write any audio data received from the interface 304 to not only the inductive couplers 116a-b via communication processors 306a-b, but also to the communication processor 306c, which performs a digital to analog conversion on the data and provides an analog signal to each of the headset connectors 314a-b.

In at least some embodiments, a physical configuration of the hub-device 108 is important to the hub-device 108 successfully performing its function. For example, in some embodiments, the hub-device 108 is configured to be positioned on a desk, table, or other flat platform that is readily available in an office environment. Thus, the hub-device includes a primary enclosure. The primary enclosure substantially encloses the components shown in FIG. 3. In some embodiments, the inductive couplers 116a-b, if so equipped, protrude through the primary enclosure, as does one or more of the headset connectors 314a-b, and/or interface 304. In some embodiments, the inductive couplers are enclosed within the primary enclosure, with the inductive coupling between a mini-hub 110 and the hub-device 108 being able to penetrate the primary enclosure and maintain a communication connection between the mini-hub 110 and the hub-device 108.

The primary enclosure is comprised, in at least some embodiments, of plastic in at least some embodiments, and has a flat bottom surface for placing on the flat platform. In some embodiments, the flat bottom surface is configured with small legs or bumpers to prevent the hub from easily sliding on the flat platform, and to offset the primary enclosure from the flat platform. A second surface, on an opposing or opposite side of the enclosure from the flat bottom, is a top surface in at least some embodiments. The inductive couplers 116a-b, if so equipped, are positioned, in at least some embodiments, to protrude through the top surface of the enclosure.

While FIG. 3 shows the hub-device 108 configured with inductive couplers 116a-b, other embodiments substitute other coupling technologies for the inductive couplers 116a-b. For example, some embodiments include one or more USB or IEEE 1394 connectors instead of the one or more inductive couplers 116a-b.

Figure 4:
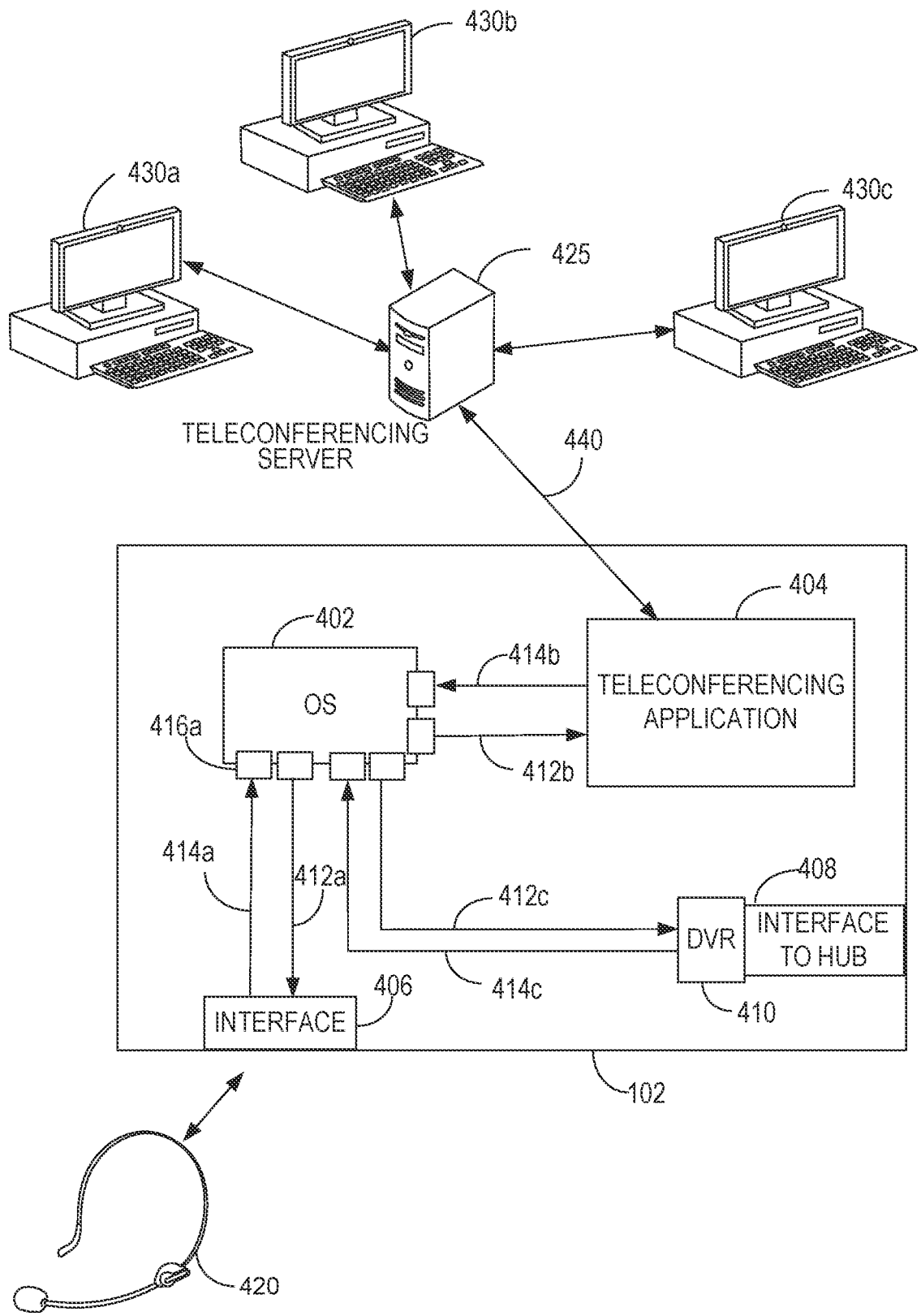
FIG. 4 is a block diagram of an example computing device, such as the computing device 102 discussed above with respect to FIG. 1.

FIG. 4 is a block diagram of an example computing device, such as the computing device 102 discussed above with respect to FIG. 1. The computing device 102 includes an operating system 402, teleconferencing application 404, interface 406, a hub interface 408, and driver 410 (e.g. software) for the interface to the hub-device. FIG. 4 shows data flowing between these components. The teleconferencing application 404 manages and/or represents a primary control point for a digital teleconference. In some embodiments, the teleconferencing application 404 is in communication with a teleconferencing server 425, to which one or more teleconferencing participant devices 430a-c are connected. The teleconferencing server 425 serves to share media data between client devices (including the computing device 102 and the devices 430a-c in FIG. 4 in the example of FIG. 4) participating in the teleconference. The teleconferencing application 404 communicates with the teleconferencing server 425 by exchanging network packets 440 with the teleconferencing server 425. The network packets 440 encode media data, such as audio and/or video data generated by teleconference participants (any of 430a-c).

FIG. 4 illustrates that the interface 406 generates media data 414a and provides it to an audio input 416a of the operating system 402. The interface 406 receives media data 412a from the operating system 402. In the illustrated embodiment, the interface 406 is wirelessly connected to a wireless headset 420. The data 414a is derived from data received from the wireless headset 420, while the media data 412a received by the interface 406 is transmitted to the wireless headset 420. Similar flows exist between the operating system 402 and the teleconferencing application 404 and driver 410. Data 414b is generated by the teleconferencing application and is provided to the operating system 402, while the operating system 402 generates media data 412b and provides the media data 412b to the teleconferencing application 404. Similarly, the driver 410 receives media data from a mini-hub (e.g. via a hub-device 108) and provides the media data 414c to the operating system 402. Media data 412c is generated by the operating system and provided to the driver 410. The driver 410 exchanges these media data 412c and media data 414c with a mini-hub-device (e.g. via a hub-device 108) connected via the hub interface 408.

Some embodiments of the operating system 402 provide for a first mode of operation that provides a shared audio stream across multiple physical devices and/or software applications. For example, the operating system 402 is configured, in these embodiments, to multiplex audio inputs received from one or more of the wireless headset 420 (e.g. via interface 406 and media data 414a), teleconferencing application 404 (via media data 414b), and hub interface 408 and/or driver 410 (via media data 414c), and to provide this multiplexed audio stream to each of the wireless headset 420 (via media data 412a), teleconferencing application 404 (via media data 412b), and hub interface 408 (via media data 414c).

Other embodiments of operating system 402 support a second mode of operation that provides only one audio input channel. For example, media data 414a, 414b, and 414c are mutually exclusive in this embodiment. Transmitting one of media data 414a, 414b, or 414c, or connecting a device to the interface 406, opening a media stream by the teleconferencing application 404, or opening a media channel via the driver 410, causes an automatic disconnect of any other audio input channels in these embodiments.

Some embodiments of the driver 410 are configured to change configuration parameters of the operating system 402 to transition the operating system 402 from the second mode (single audio input) to the first mode (allowing multiple audio inputs). For example, some embodiments of the driver 410, upon detecting connectivity with a hub-device (e.g., hub-device 108), the driver 410 toggles (e.g. via an operating system API or APIs) the computing device 102 into the first mode. Upon detecting a lack of connectivity with a hub-device, the driver 410 toggles the computing device 102 (e.g. again via OS APIs) into the second mode.

Figure 5:
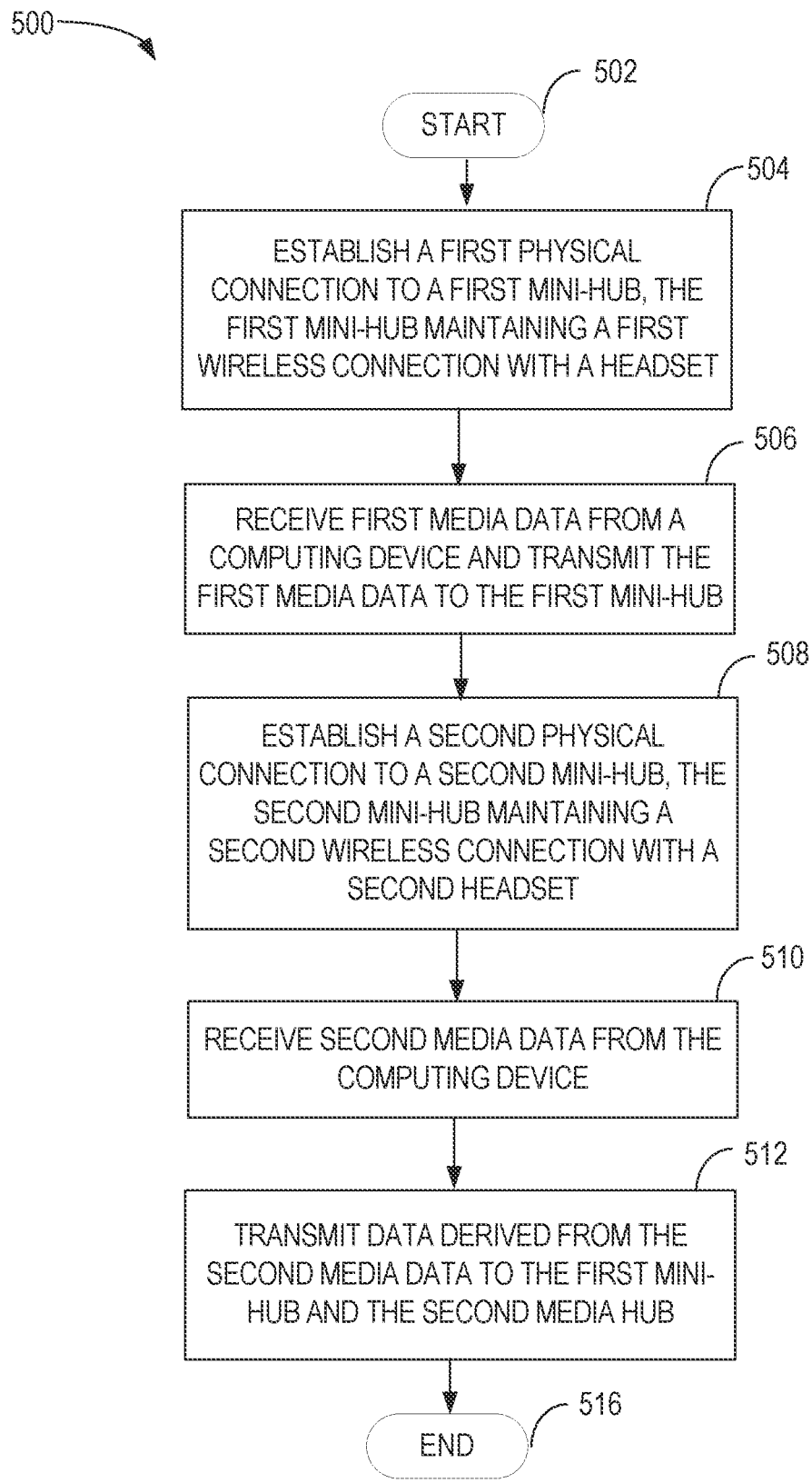
FIG. 5 is a flowchart of a process for multiplexing a plurality of audio channels via a hub-device.

FIG. 5 is a flowchart of a process for multiplexing a plurality of audio channels via a hub-device. In some embodiments, one or more of the functions discussed below with respect to FIG. 5 is performed by the hardware processor 308, discussed below with respect to FIG. 3.

After start operation 502, process 500 moves to operation 504, which establishes a first physical connection with a first mini-hub. The first physical connection with the first mini-hub is established via a first cradle integrated with the hub-device. The first mini-hub maintains a first wireless connection with a wireless headset. Thus, the first mini-hub maintained the first wireless connection prior to establishing the first physical connection with the hub-device, and also maintains the first wireless connection after establishing the first physical connection with the hub-device. In some embodiment, the first mini-hub maintains the first wireless connection with the wireless headset by implementing a Bluetooth "media gateway" role with respect to the first wireless connection. As discussed above with respect to the example mini-hub and hub-devices of FIGS. 2 and 3, the physical connection is established via a mini-hub being placed in a cradle that provides for an electronic communication connection to be established between the hub-device and the mini-hub-device. In some embodiments, the physical connection is established via an inductive connector. In other embodiments, the physical connection is established via a direct electrical connection between contacts of the hub-device and the mini-hub-device (or a cable connecting the two devices). The physical connection provides data communication between the hub-device and the min-hub-device in both directions. The physical connection also provides, in at least some embodiments, an ability to flow electrical power from the hub-device to the mini-hub-device. The electrical power flow from the hub-device is used, in some embodiments, to recharge a battery of the mini-hub-device.

In operation 506, first media data is received from a computing device. For example, in some embodiments, the first media data is received via a wired connection between a computing device, (e.g. 102), such as a personal computer. The first media data is generated, in at least some embodiments, by a teleconferencing application hosted on the computing device (e.g. 404). The first media data represents, in at least some embodiments, voice data generated by teleconferencing application. For example, the teleconferencing application, in some embodiments, receives a network packet from a remote teleconferencing server. The network packet encodes data representing a voice signal of other participants of the teleconference. In some embodiments, the first media data represents voice data generated by a microphone associated with the computing device itself. For example, the first media data in some embodiments, is generated by the wireless headset 420.

In operation 508, a second physical connection to a second mini-hub is established. The second physical connection is established via a second cradle integrated with the hub-device. In some embodiments, a first time period while the first physical connection is maintained and a second time period while the second physical connection is maintained overlap. Thus, in at least some situations, the hub-device is physically connected to two or more mini-hub-devices simultaneously. In some embodiments, the second mini-hub maintains the second wireless connection with the second wireless headset by implementing a Bluetooth "audio gateway" role with respect to the second wireless connection.

In operation 510, second media data is received from the computing device. The second data is received, in at least some embodiments, via a wired interface between the computing device (e.g. 102) and hub device (e.g. 108). In some embodiments, the second media data represents voice data or other media data from teleconference participants. For example, in some embodiments, one or more network packets are received by a teleconferencing application (e.g. 404) from a remote teleconferencing server (e.g. a teleconferencing server accessible via the Internet). These one or more network packets encode voice and/or video teleconferencing data generated by these teleconferencing participants.

In operation 512, data derived from the second media data is transmitted to the first mini-hub via the first physical connection and to the second mini-hub via the second physical connection. Each of the first and second mini-hubs then, in at least some embodiments, transmit this data to their respective wireless headsets, which convert the data into auditory signals.

Some embodiments of operation 512 include receiving third media data from the first mini-hub via the first physical connection and receiving fourth media data from the second mini-hub. The third and fourth media data are then multiplexed so as to synchronize, in time, the third and fourth media data. The multiplexed media data is transmitted to the computing device via a third physical connection. For example, as discussed above with respect to the example hub-device 108, a mini-hub-device maintains a digital communication connection with a computing device, such as the computing device 102 of FIG. 1. These embodiments of operation 512 pass the multiplexed media data to the computing device, which, at least in some embodiments, provides the multiplexed media data to a digital telephony application (e.g. 404). The digital telephony application communicates the media data over a digital connection (e.g. voice over Internet protocol (VoIP) and/or serial Internet protocol (SIP)) to a remote teleconferencing server or if using a peer to peer protocol for teleconferencing (e.g. Peer-to-peer SIP (P2P-SIP), over the peer to peer protocol.

Note that some embodiments also receive sixth media data from the third physical connection and transmit the sixth media data, or data derived from sixth third media data, to both the first mini-hub and the second mini-hub via the first and second physical connections respectively. After operation 512, process 500 moves to end operation 516.

Figure 6:
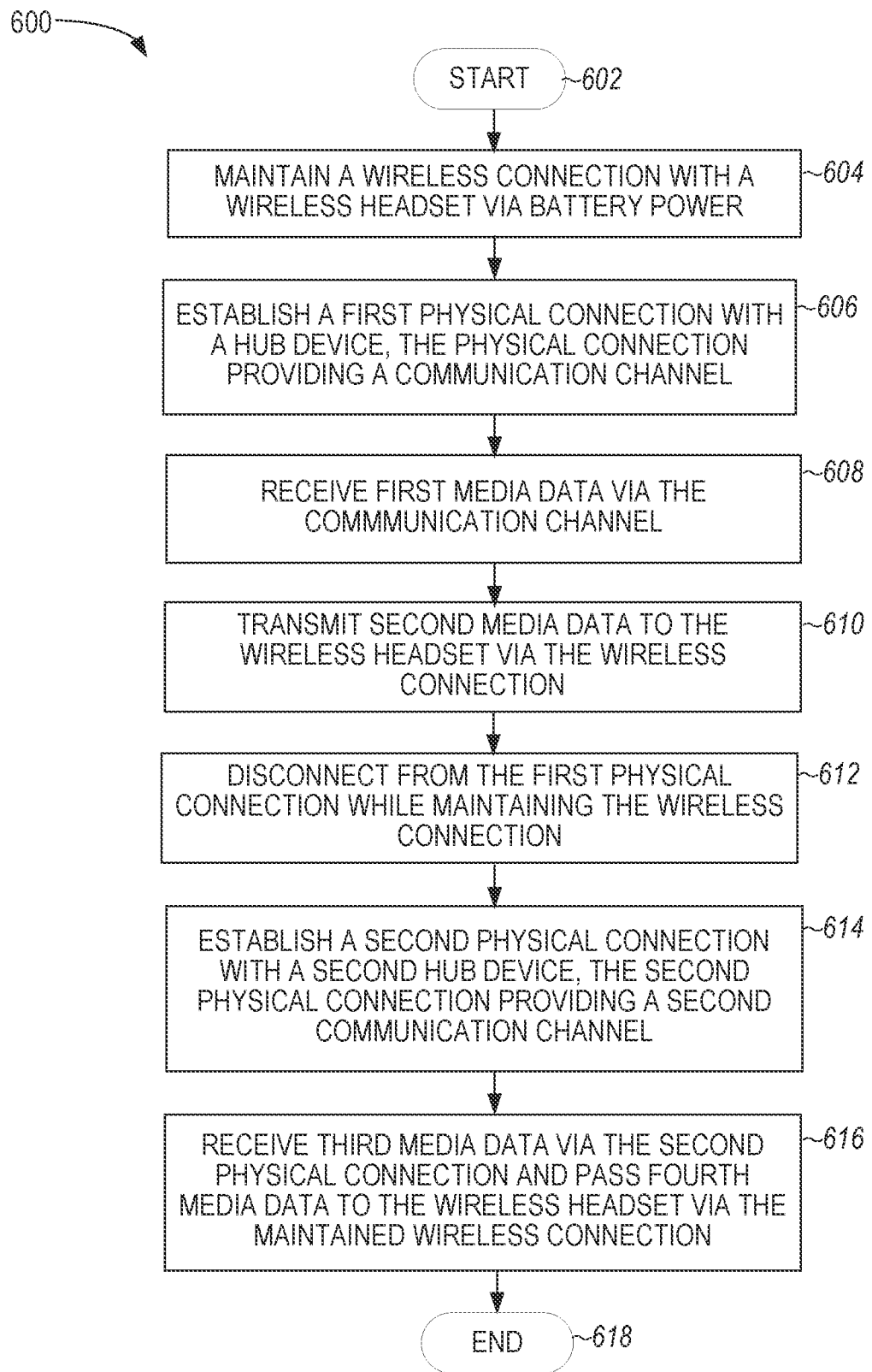
FIG. 6 is a flowchart of a process for establishing a physical connection with a hub-device.

FIG. 6 is a flowchart of a process for establishing a physical connection with a hub-device. In some embodiments, one or more of the functions discussed below with respect to FIG. 5 is performed by a min-hub device. For example, in some embodiments, instructions stored in an electronic memory configure the hardware processor 208, discussed below with respect to FIG. 2, to perform one or more of the functions discussed below.

After start operation 602, process 600 moves to operation 604, where a wireless connection with a wireless headset is maintained. The wireless connection is maintained via battery power. For example, as discussed above, the mini-hub 110 includes the battery 202, which is operably connected to the processor 208, and other components of the mini-hub 110 as required such that the mini-hub 110 is able to maintain a wireless connection with a wireless headset Thus, in operation 604, the mini-hub has no connection to a wired power source. In some embodiments, the connection with the wireless headset is maintained by the mini-hub via implementation of the Bluetooth "audio gateway" role.

In operation 606, a first physical connection is established with a hub-device. The physical connection provides a first communication channel between the mini-hub and the hub-device. Thus, the first physical connection provides for transmission of digital data from the mini-hub to the hub-device. The first physical connection also provides for transmission of digital data from the hub-device to the mini hub. In some embodiments, the first physical connection provides for electrical power transfer from the hub-device to the mini-hub-device. The mini-hub-device can use this electrical power for current operation and/or to recharge its battery (e.g. 202). In some embodiments, the first physical connection is established using near field communication protocols. For example, in some embodiments, process 600 implements ECMA-340 and/or ISO/IEC 18092 protocol to maintain the first physical connection. In some embodiments, the first physical connection is established using inductive technology, such as near-field magnetic induction (NFMI) technology.

In operation 608, first media data is received via the first communication channel. For example, in some embodiments, the first media data is an audio feed from a teleconference hosted by a software application on a computing device (e.g. 102). In some embodiments, the first media data includes a video feed from a teleconference hosted by a software application on the computing device. In some embodiments of operation 608, additional media data is received from the wireless headset via the wireless connection. The additional media data, in some embodiments, is audio information generated by a microphone of the wireless headset.

In operation 610, second media data derived from the first media data is transmitted to the wireless headset via the wireless connection. If the additional media data is received from the wireless headset in operation 608, then in operation 610, further media data derived from the additional media data is transmitted to the first hub-device via the first communication channel.

In operation 612, the first physical connection is disconnected. For example, in some embodiments, the disconnection of the first physical connection is caused by the mini-hub being removed from a cradle on the hub-device. In embodiments utilizing an inductive communication technology between the mini-hub and the hub-device, once a distance between the mini-hub and the hub-device becomes greater than a predetermine threshold (e.g. three inches, six inches, one foot, etc), the inductive communication technology is no longer able to maintain the first communication channel. In other embodiments that utilize a direct electrical connection between directly touching and connected contacts on the hub and mini-hub to establish the first communication channel (e.g. usb), the disconnection is caused when those electrical contacts no longer touch and become disconnected. Disconnecting the first physical connection also cause the first communication channel to become disconnected or other inoperative.

Despite the first physical connection and thus the first communication channel being disconnected, process 600 continues to maintain the wireless connection with the wireless headset. For example, when process 600 is performed by a mini-hub, the mini-hub is able to maintain the wireless connection with the wireless headset via battery power. As discussed above, in some embodiments, the wireless connection is maintained with the wireless headset via implementation of the Bluetooth "audio gateway" role.

In operation 614, a second physical connection is established with a second hub-device. The second physical connection provides a second communication channel between the min-hub and the second hub-device. Similar to the first physical connection, in some embodiments, and inductive connection or near field communication technology is utilized to provide the second physical connection. The second communication channel provides for digital transfer of information between the mini-hub and the second hub-device.

In operation 616, third media data is received via the second communication channel and the second physical connection. The third media data is received from the second hub-device. In some embodiments, the third media data represents audio and/or video data of a second teleconference hosted by a second computing device. The second computing device is connected to the second hub-device. Fourth media data derived from the third media data is then passed to the wireless headset via the wireless connection. In some embodiments of operation 616, fifth media data is received from the wireless connection (e.g. from the microphone of the headset), and sixth media data derived from the fifth media data is transmitted to the second hub-device via the second communication channel. After operation 616, process 600 moves to end operation 618.

Figure 7:
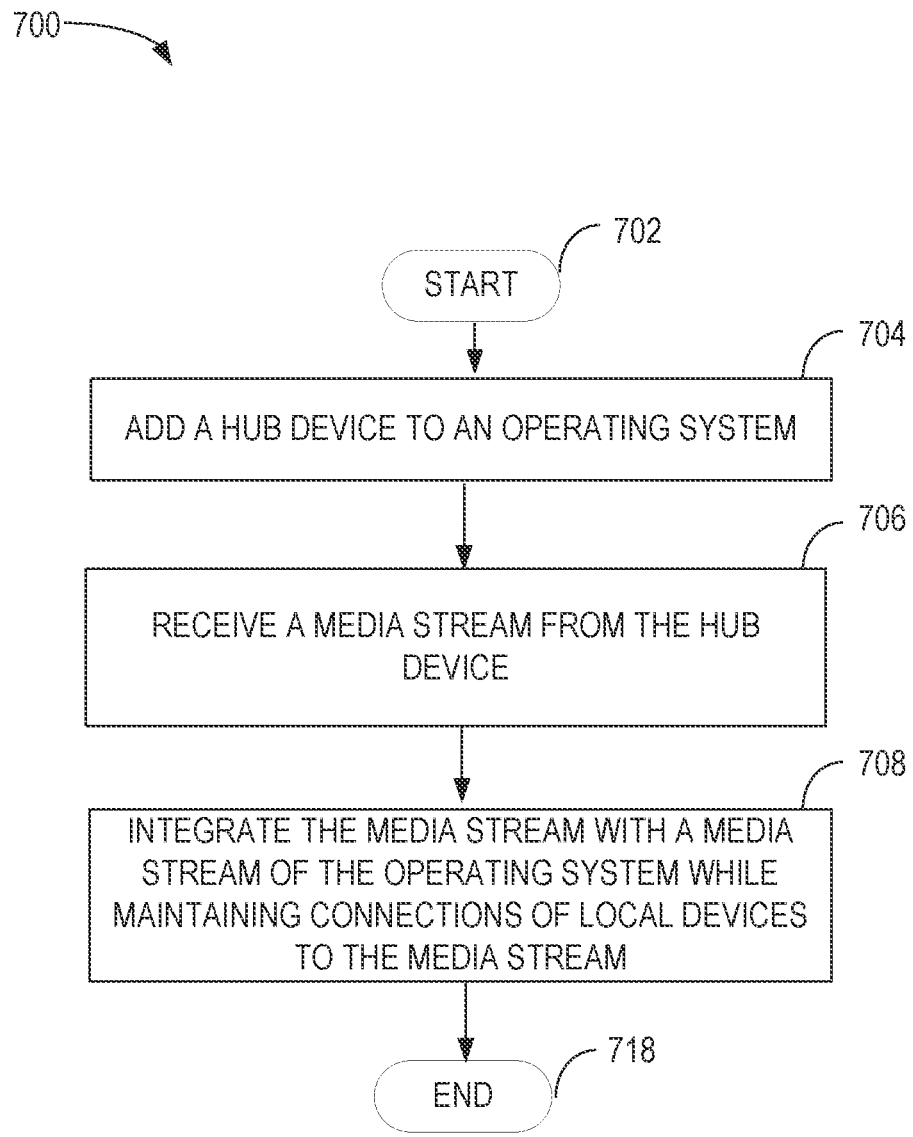
FIG. 7 is a flowchart of a process for integrating a media stream from a hub-device with a media stream of a computing device.

FIG. 7 is a flowchart of a process for integrating a media stream of a hub-device with a media stream of a computing device. In some embodiments, one or more of the functions discussed below with respect to FIG. 7 and the process 700 are performed by the computing device 102, discussed above with respect to FIG. 1. For example, instructions (e.g. 824) stored in a memory (e.g. of the computing device 102, e.g. 802 and/or 806) configure hardware processing circuitry (such as a hardware processor of the computing device 102, e.g. processor 802) to perform one or more of the functions discussed below with respect to FIG. 7. In some embodiments, instructions stored in the driver 410 perform the one or more functions discussed below with respect to FIG. 7.

After start operation 702, the process 700 moves to operation 704, which adds a hub-device to an operating system. In some embodiments, adding the hub-device includes adding a driver to the operating system. Adding the driver to the operating system can include, for example, registering the driver in an operating system database. The registering indicates that the driver is notified when media data is generated by an application running on the computing device, such as the teleconferencing application 404.

In operation 706, a media stream is received from the hub-device. In some embodiments, a driver, such as the driver 410, is configured to process messages to and/or from the hub-device. For example, the driver is configured, in some embodiments, to transmit media data, such as media data and/or video data, from an operating system of a computing device to the hub-device. Similarly, the driver is configured, in some embodiments, to transmit media data received from the hub-device, to the operating system of the computing device. As discussed above with respect to FIG. 4, in some embodiments, an operating system provides media channels, such as audio channels, which are utilized when performing teleconferencing via a locally running teleconferencing application (e.g. 404).

In operation 708, the media stream received from the hub-device is integrated with a media stream of the operating system while maintaining connections of other local devices to the media stream. Thus, in operation 708, any media data received from the hub-device is integrated with other media data generated by the operating system and/or applications running on the operating system, such as the teleconferencing application 404.

Some embodiments of an operating system operate with a single media source at any one time. Thus, for example, plugging in a microphone to a microphone jack of a computing device disables an integrated microphone of the laptop, in at least some configuration of the computing device. Embodiments disclosed seek not to replace a media stream that may be otherwise generated by, for example, a local microphone or other wireless headset which is configured to operate with the computing device (e.g. 406). Instead, the disclosed embodiments, and in some cases via the driver 410, instead integrate media information flowing from the interface 406 and/or wireless headset 420, with other media information flowing from a hub-device via driver 410. Thus, for example, if an operator sitting next to a console including a computing device 102, requests assistance from a supervisor. The supervisor may attach their mini hub (e.g. mini-hub 110) to a hub-device (e.g. hub-device 108) that is physically connected to the computing device (e.g. 102) via a physical interface (e.g. 408). After operation 718, the process 700 moves to end operation 718.

In some embodiments, the driver 410, or an associated support program that is installed along with the driver 410 (not shown in FIG. 4), configures the operating system 402 in a manner that allows the wireless headset 420 and the hub-device to communicate over a shared media stream. This shared media stream is delivered to the teleconferencing application 404 by the operating system 402. Configuring of the operating system 402 in this manner can include, in various embodiments, application programming interface (s) that set a mode of the media stream to permit multiple devices to contribute to and receive the media stream. In some embodiments, the driver 410 or the support program store configuration settings of the computing device prior to changing the setting to accommodate the shared media stream. After the hub-device (connected via the hub interface 408) has no mini-hubs connected to it, the driver 410 is configured, in at least some embodiments, to sense this condition and restore the operating system's previous configuration based on the stored information. Similarly, upon detection of a first mini-hub being placed in a cradle of the hub-device, the driver and/or support program store and modify settings to accommodate the shared media stream.

Figure 8:
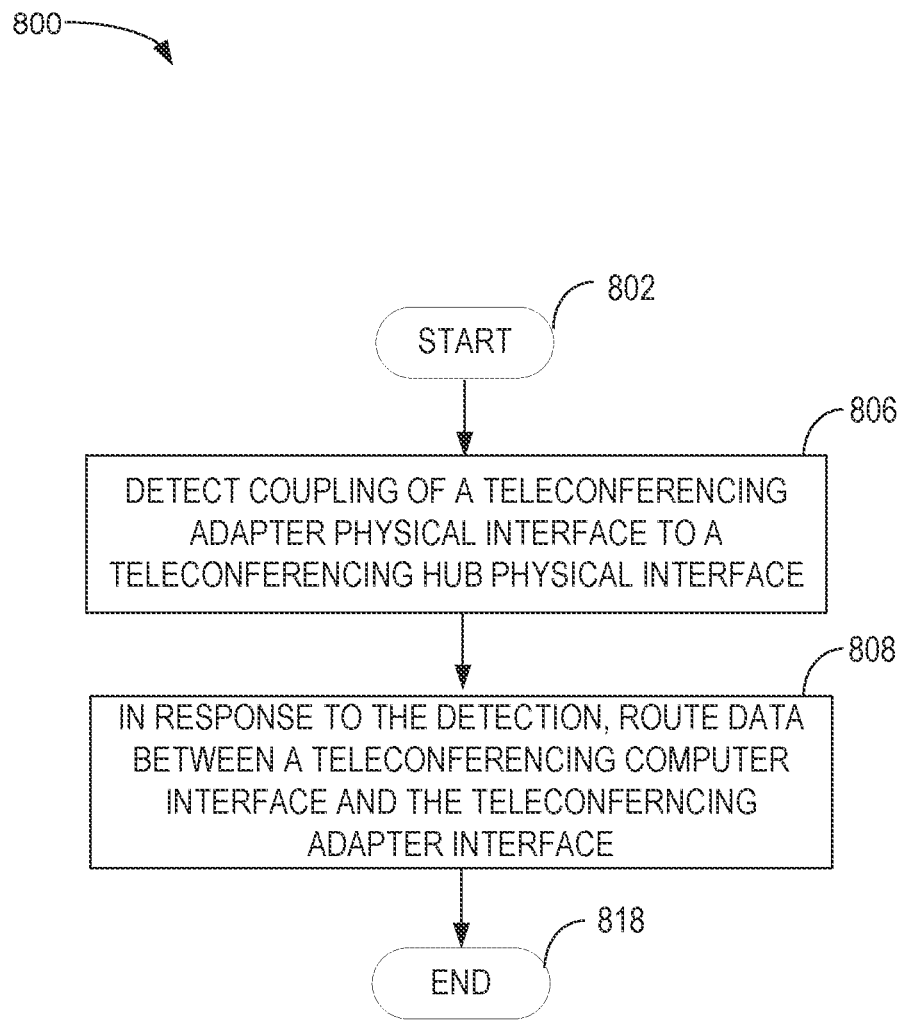
FIG. 8 is a flowchart of a process for integrating a media stream from a hub-device with a media stream of a computing device.

FIG. 8 is a method of routing audio between a teleconference computing device and a wireless headset using a teleconference hub (e.g. hub-device). The teleconference hub includes a teleconferencing computing device interface to the teleconferencing computing device, and a teleconference hub physical interface. A teleconference adapter (e.g. mini-hub) includes a headset wireless interface configured to transmit data to a headset and an adapter physical interface that is complementary to the teleconference hub physical interface. In some embodiments, the process 800 discussed below with respect to FIG. 8 is performed by a teleconference hub, or hub-device. For example, in some aspects, instructions stored in memory 210 configure the processor 208 to perform one or more of the functions discussed below with respect to FIG. 8.

In operation 806, a coupling between the teleconference hub physical interface and the teleconference hub adapter physical interface is detected. For example, as discussed above, the teleconference adapter and the teleconference hub interface, in various embodiments, via an inductive, near field communication, or wired interface. The physical interface provides a digital communication channel between the teleconference hub and the teleconference adapter. In some embodiments, the coupling provides for electrical power to be transferred from the teleconference hub to the teleconference adapter.

In operation 808, data is routed between the teleconferencing computing device interface and the teleconference adapter interface. For example, in some embodiments, data encoding teleconference data of a teleconference hosted by a computing device attached to the teleconference hub, is routed from the computing device to the teleconference hub via the teleconferencing computer interface, and then to the teleconference adapter interface. By providing the data to the teleconference adapter interface, the data is conveyed to a teleconference adapter (e.g. mini-hub). The teleconference adapter then provides the data to a wireless headset paired with the teleconference adapter. For example, the teleconference adapter implements, in at least some embodiments, a Bluetooth "audio gateway" role, while the wireless headset implements a Bluetooth "hands free device" role.

As discussed above, for example, with respect to FIG. 2, a teleconference hub or hub-device includes multiple cradles and/or physical connections that provide for a connection of multiple mini-hubs (e.g. teleconference adapters) to the hub-device. As teleconference adapters are dynamically coupled and/or decoupled from the hub-device, media data channels between these teleconference adapters and the hub device, are added or subtracted from one or more media channels between the hub-device and the computing device. The hub-device (e.g. teleconference hub) multiplexes data received from any one of these channels with the other channels, enabling dynamic addition and subtraction of teleconference participants to a teleconference hosted by the computing device via cradling and detaching of teleconference adaptors (e.g. mini-hubs) from the teleconference hub (hub-device). As discussed above with respect to FIG. 3, some embodiments of a hub-device include a wireless interface that provides for pairing of a wireless headset with the hub-device itself. For example, the hub-device implements a Bluetooth "audio gateway" role in some embodiments. The hub-device then multiplexes media data sent/received to/from the paired wireless headset with other media channels established between the computing device and/or one or more teleconference adaptors (mini-hubs). After operation 808, process 800 moves to end operation 818.

Figure 9:
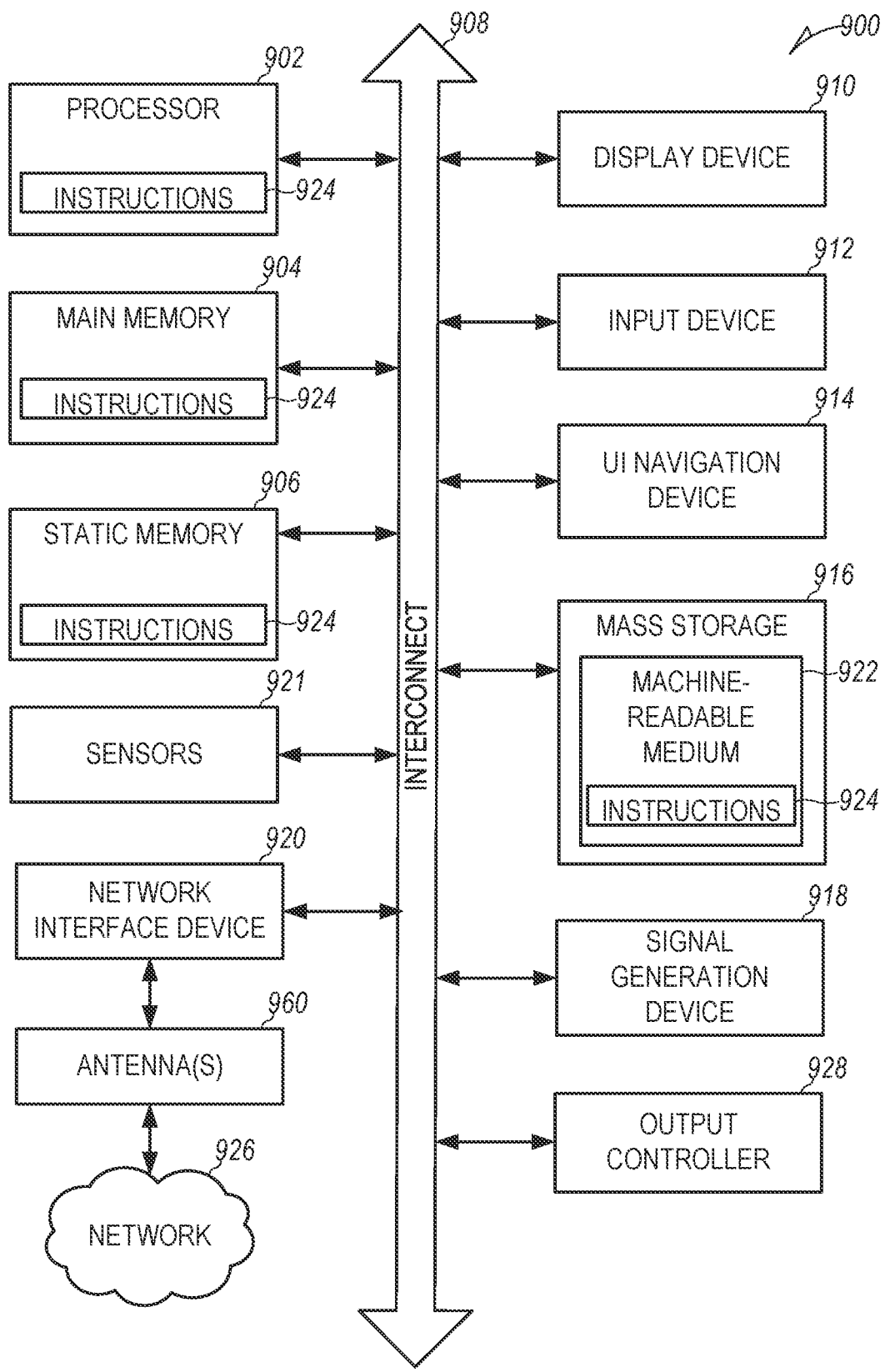
FIG. 9 illustrates a block diagram of an example machine upon which any one or more of the techniques (e.g., methodologies) discussed herein may be performed.

FIG. 9 illustrates a block diagram of an example machine 900 upon which any one or more of the techniques (e.g., methodologies) discussed herein may perform. Machine 900 (e.g., computer system) may include a hardware processor 902 (e.g., a central processing unit (CPU), a graphics processing unit (GPU), a hardware processor core, or any combination thereof), a main memory 904 and a static memory 906, some or all of which may communicate with each other via an interlink 908 (e.g., bus).

Specific examples of main memory 904 include Random Access Memory (RAM), and semiconductor memory devices, which may include, in some embodiments, storage locations in semiconductors such as registers. Specific examples of static memory 906 include non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; RAM; and CD-ROM and DVD-ROM disks.

The machine 900 may further include a display device 910, an input device 912 (e.g., a keyboard), and a user interface (UI) navigation device 914 (e.g., a mouse). In an example, the display device 910, input device 912 and UI navigation device 914 may be a touch screen display. The machine 900 may additionally include a mass storage device (e.g., drive unit) 916, an audio signal generation device 918 (e.g., a speaker), a network interface device 920, and one or more sensors 921, such as a global positioning system (GPS) sensor, compass, accelerometer, or other sensor. The machine 900 may include an output controller 928, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.). In some embodiments the hardware processor 902 and/or instructions 924 may comprise processing circuitry and/or transceiver circuitry.

The mass storage device 916 may include a machine readable medium 922 on which is stored one or more sets of data structures or instructions 924 (e.g., software) embodying or utilized by any one or more of the techniques or functions described herein. The instructions 924 may also reside, completely or at least partially, within the main memory 904, within static memory 906, or within the hardware processor 902 during execution thereof by the machine 900. In an example, one or any combination of the hardware processor 902, the main memory 904, the static memory 906, or the mass storage device 916 may constitute machine readable media.

Specific examples of machine-readable media may include: non-volatile memory, such as semiconductor memory devices (e.g., EPROM or EEPROM) and flash memory devices; magnetic disks, such as internal hard disks and removable disks; magneto-optical disks; RAM; and CD-ROM and DVD-ROM disks.

While the machine readable medium 922 is illustrated as a single medium, the term "machine readable medium" may include a single medium or multiple media (e.g., a centralized or distributed database, and/or associated caches and servers) configured to store the instructions 924.

An apparatus of the machine 900 may be one or more of a hardware processor 902 (e.g., a central processing unit (CPU), a graphics processing unit (GPU), a hardware processor core, or any combination thereof), a main memory 904 and a static memory 906, one or more sensors 921, network interface device 920, one or more antennas 960, a display device 910, an input device 912, a UI navigation device 914, a mass storage device 916, instructions 924, a signal generation device 918, and an output controller 928. The apparatus may be configured to perform one or more of the methods and/or operations disclosed herein. The apparatus may be intended as a component of the machine 900 to perform one or more of the methods and/or operations disclosed herein, and/or to perform a portion of one or more of the methods and/or operations disclosed herein. In some embodiments, the apparatus may include a pin or other means to receive power. In some embodiments, the apparatus may include power conditioning hardware.

The term "machine readable medium" may include any medium that is capable of storing, encoding, or carrying instructions for execution by the machine 900 and that cause the machine 900 to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); and CD-ROM and DVD-ROM disks. In some examples, machine readable media may include non-transitory machine readable media. In some examples, machine readable media may include machine readable media that is not a transitory propagating signal.

The instructions 924 may further be transmitted or received over a communications network 926 using a transmission medium via the network interface device 920 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, a Long Term Evolution (LTE) family of standards, a Universal Mobile Telecommunications System (UMTS) family of standards, peer-to-peer (P2P) networks, among others.

In an example, the network interface device 920 may include one or more physical jacks (e.g., Ethernet, coaxial, or phone jacks) or one or more antennas to connect to the communications network 926. In an example, the network interface device 920 may include one or more antennas 960 to wirelessly communicate using at least one of single-input multiple-output (SIMO), multiple-input multiple-output (MIMO), or multiple-input single-output (MISO) techniques. In some examples, the network interface device 920 may wirelessly communicate using Multiple User MIMO techniques. The term "transmission medium" shall be taken to include any intangible medium that is capable of storing, encoding or carrying instructions for execution by the machine 900, and includes digital or analog communications signals or other intangible medium to facilitate communication of such software.

Examples, as described herein, may include, or may operate on, logic or a number of components, modules, or mechanisms. Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine readable medium. In an example, the software, when executed by the underlying hardware of the module, causes the hardware to perform the specified operations.

The techniques of various embodiments may be implemented using software, hardware and/or a combination of software and hardware. Various embodiments are directed to apparatus, e.g., management entities, e.g., a network monitoring node, routers, gateways, switches, access points, DHCP servers, DNS servers, AAA servers, user equipment devices, e.g., wireless nodes such as mobile wireless terminals, base stations, communications networks, and communications systems. Various embodiments are also directed to methods, e.g., method of controlling and/or operating a communications device or devices, e.g., a network management node, an access point, wireless terminals (WT), user equipment (UEs), base stations, control nodes, DHCP nodes, DNS servers, AAA nodes, Mobility Management Entities (MMEs), networks, and/or communications systems. Various embodiments are also directed to non-transitory machine, e.g., computer, readable medium, e.g., ROM, RAM, CDs, hard discs, etc., which include machine readable instructions for controlling a machine to implement one or more steps of a method.

It is understood that the specific order or hierarchy of steps in the processes disclosed are provided as example approaches. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

In various embodiments devices and nodes described herein are implemented using one or more modules to perform the steps corresponding to one or more methods, for example, signal generation, transmitting, processing, analyzing, and/or receiving steps. Thus, in some embodiments various features are implemented using modules. Such modules may be implemented using software, hardware or a combination of software and hardware. In some embodiments each module is implemented as an individual circuit with the device or system including a separate circuit for implementing the function corresponding to each described module. Many of the above described methods or method steps can be implemented using machine executable instructions, such as software, included in a machine readable medium such as a memory device, e.g., RAM, floppy disk, etc. to control a machine, e.g., general purpose computer with or without additional hardware, to implement all or portions of the above described methods, e.g., in one or more nodes. Accordingly, among other things, various embodiments are directed to a machine-readable medium e.g., a non-transitory computer readable medium, including machine executable instructions for causing a machine, e.g., processor and associated hardware, to perform one or more of the steps of the above-described method(s). Some embodiments are directed to a device including a processor configured to implement one, multiple or all of the operations of the disclosed embodiments.

In some embodiments, the processor or processors, e.g., CPUs, of one or more devices, e.g., communications devices such as routers, switches, network attached servers, network management nodes, wireless terminals (UEs), and/or access nodes, are configured to perform the steps of the methods described as being performed by the devices. The configuration of the processor may be achieved by using one or more modules, e.g., software modules, to control processor configuration and/or by including hardware in the processor, e.g., hardware modules, to perform the recited steps and/or control processor configuration. Accordingly, some but not all embodiments are directed to a communications device, e.g., user equipment, with a processor which includes a module corresponding to each of the steps of the various described methods performed by the device in which the processor is included. In some but not all embodiments a communications device includes a module corresponding to each of the steps of the various described methods performed by the device in which the processor is included. The modules may be implemented purely in hardware, e.g., as circuits, or may be implemented using software and/or hardware or a combination of software and hardware.

Some embodiments are directed to a computer program product comprising a computer-readable medium comprising code for causing a computer, or multiple computers, to implement various functions, steps, acts and/or operations, e.g. one or more steps described above. Depending on the embodiment, the computer program product can, and sometimes does, include different code for each step to be performed. Thus, the computer program product may, and sometimes does, include code for each individual step of a method, e.g., a method of operating a communications device, e.g., a network management node, an access point, a base station, a wireless terminal or node. The code may be in the form of machine, e.g., computer, executable instructions stored on a computer-readable medium such as a RAM (Random Access Memory), ROM (Read Only Memory) or other type of storage device. In addition to being directed to a computer program product, some embodiments are directed to a processor configured to implement one or more of the various functions, steps, acts and/or operations of one or more methods described above. Accordingly, some embodiments are directed to a processor, e.g., CPU, configured to implement some or all of the steps of the methods described herein. The processor may be for use in, e.g., a communications device or other device described in the present application.

While described in the context of a communications system including wired, optical, cellular, Wi-Fi, Bluetooth and BLE, at least some of the methods and apparatus of various embodiments are applicable to a wide range of communications systems including IP and non IP based, OFDM and non-OFDM and/or non-cellular systems.

Numerous additional variations on the methods and apparatus of the various embodiments described above will be apparent to those skilled in the art in view of the above description. Such variations are to be considered within the scope. The methods and apparatus may be, and in various embodiments are, used with IP based and non-IP, wired and wireless such CDMA, orthogonal frequency division multiplexing (OFDM), Wi-Fi, Bluetooth, BLE, optical and/or various other types of communications techniques which may be used to provide communications links between network attached or associated devices or other devices including receiver/transmitter circuits and logic and/or routines, for implementing the methods.

Example 1 is a device comprising: a first interface; a second interface; hardware processing circuitry configured to perform operations comprising: establishing, via the first interface, a first physical connection with a first mini-hub, the first mini-hub maintaining a first wireless connection with a first wireless headset; receiving, via the second interface, first media data from a computing device, the first media data generated by a digital teleconference maintained by the computing device; transmitting, via the first physical connection, the first media data to the first wireless headset.

In Example 2, the subject matter of Example 1 optionally includes the operations further comprising: receiving second media data from the first mini-hub via the first physical connection; and transmitting, via the second interface, the second media data to the computing device.

In Example 3, the subject matter of any one or more of Examples 1-2 optionally include a third interface, the operations further comprising establishing a second physical connection with a second mini hub via the third interface, and the operations further comprising: establishing, via the third interface, a second physical connection with a second mini-hub, the second mini-hub maintaining a second wireless connection with a second wireless headset; receiving, via the second physical connection, second media data from the computing device, the second media data generated by the digital teleconference maintained by the computing device; and transmitting data derived from the second media data to the first mini-hub via the first physical connection and to the second mini-hub via the second physical connection.

In Example 4, the subject matter of any one or more of Examples 1-3 optionally include wherein the first physical connection between the first mini-hub and the device is provided via a first cradle configured to physically accept the first mini-hub.

In Example 5, the subject matter of any one or more of Examples 3-4 optionally include the operations further comprising: receiving third media data from the first mini-hub via the first interface; receiving fourth media data from the second mini-hub via the third interface; multiplexing the third media data with the fourth media data; and transmitting the multiplexed media data to the computing device.

In Example 6, the subject matter of any one or more of Examples 1-5 optionally include wherein the first interface is an inductive interface, and the operations further comprise inductively communicating with the first mini-hub via the inductive interface.

In Example 7, the subject matter of any one or more of Examples 1-6 optionally include a power supply, wherein the device is configured to provide power from the power supply to the first mini-hub via the first interface.

In Example 8, the subject matter of any one or more of Examples 1-7 optionally include an enclosure, the enclosure including a flat bottom surface.

In Example 9, the subject matter of Example 8 optionally includes a top surface of the enclosure opposing the flat bottom surface of the enclosure, wherein a first cradle is positioned on the top surface of the enclosure, and the first physical connection is established when the first mini-hub is positioned in the first cradle.

In Example 10, the subject matter of any one or more of Examples 1-9 optionally include wherein the first mini-hub is a hand-held device without a display.

In Example 11, the subject matter of any one or more of Examples 1-10 optionally include wherein the second interface is a universal serial bus interface.

In Example 12, the subject matter of any one or more of Examples 1-11 optionally include wherein the first mini-hub implements a Bluetooth "audio gateway" role with respect to the first wireless connection to the first wireless headset.

Example 13 is a teleconferencing system, comprising: a teleconference hub comprising: a first interface being couplable to a teleconference computing device; a second interface including a teleconference hub physical interface, and multi-media data multiplexing hardware configured to route multi-media data between the first and second interfaces; and a teleconference adapter comprising: a teleconference adapter wireless interface configured to transmit multi-media data to a headset, and a teleconferencing physical interface that is complementary to the teleconference hub physical interface, wherein, in use, when the teleconference adapter physical interface is coupled to the teleconference hub physical interface, a multimedia data path is created between the teleconference adapter wireless interface and the first interface.

In Example 14, the subject matter of Example 13 optionally includes the teleconference hub further comprising a third teleconferencing interface including a second teleconference hub physical interface, wherein the multi-media data multiplexing hardware is further configured to route audio data between the first, second, and third interfaces.

In Example 15, the subject matter of Example 14 optionally includes a second teleconference adapter comprising second teleconference adapter wireless interface configured to transmit audio data to a second headset; and wherein the teleconference hub further comprises a second adapter physical interface complementary to the second teleconference hub physical interface, the teleconference hub configured to route multi-media data from the second teleconference adapter to the teleconference computing device.

Example 16 is a method of routing between a teleconference computing device and a wireless headset using a) a teleconference hub having a teleconference computing device interface, and a teleconference hub physical interface, and b) an teleconference adapter having an adapter wireless interface configured to transmit multi-media data to a headset and an adapter physical interface that is complementary to the teleconference hub physical interface, the method comprising: detecting coupling of the adapter physical interface to the teleconference hub physical interface; establishing a first communication channel between the teleconference hub and the teleconference adapter in response to the detecting; in response to said establishing, routing multi-media data between the teleconference computing device interface and the adapter wireless interface via the first communication channel.

In Example 17, the subject matter of Example 16 optionally includes wherein the teleconference hub includes a second teleconference hub physical interface, and the method multiplexes multi-media data between the teleconference computing device, the wireless headset, and a second wireless headset, the routing of the multi-media data to the second wireless headset via a second teleconference adapter having a second adapter physical interface, the method comprising: second detecting of a coupling of the second adapter physical interface to the second teleconference hub physical interface; second establishing a second communication channel between the teleconference hub and the second teleconference adapter in response to the second detecting; second receiving second multi-media data from the teleconference computing device via the teleconference computing device interface; and in response to said second receiving, routing data derived from the second multi-media data to the wireless headset and the second wireless headset via the first communication channel and second communication channel respectively.

In Example 18, the subject matter of Example 17 optionally includes receiving third multi-media data from the teleconference adapter via the first communication channel; and routing data derived from the third multi-media data to the second teleconference adapter via the second communication channel and to the teleconference computing device via the teleconference computing device interface.

In Example 19, the subject matter of any one or more of Examples 17-18 optionally include wherein the teleconference hub includes a teleconference hub wireless interface, the method further comprising: pairing with a third wireless headset via the teleconference hub wireless interface; and receiving media data received from any one of the first communication channel, second communication channel, computing device, or third wireless headset; and distributing data derived from the media data to the one or more of the first communication channel, second communication channel, computing device, or third wireless headset.

Example 20 is a non-transitory computer readable storage medium comprising instructions that when executed configure hardware processing circuitry to perform operations to route media data between a teleconference computing device and a wireless headset using a) a teleconference hub having a teleconference computing device interface, and a teleconference hub physical interface, and b) an teleconference adapter having an adapter wireless interface configured to transmit multi-media data to a headset and an adapter physical interface that is complementary to the teleconference hub physical interface, the operations comprising: detecting coupling of the adapter physical interface to the teleconference hub physical interface; establishing a first communication channel between the teleconference hub and the teleconference adapter in response to the detecting; and in response to said establishing, routing multi-media data between the teleconference computing device interface and the adapter wireless interface via the first communication channel.

The invention claimed is:

1. A device comprising:
a plurality of interfaces; and
hardware processing circuitry configured to perform operations comprising:
based on establishing, via a first interface of the plurality of interfaces, a first physical connection with a first mini-hub, adding a first logical communication channel between the first mini-hub and a computing device executing a digital teleconference, the first mini-hub maintaining a first wireless connection with a first wireless headset;
receiving, via the first logical communication channel between the first mini-hub and the computing device, first media data generated by the digital teleconference executing on the computing device;
transmitting, via the first logical communication channel, the first media data to the first wireless headset via the first mini-hub;
based on establishing, via a second interface of the plurality of interfaces, a second physical connection with a second mini-hub, adding a second logical communication channel between the second mini-hub and the computing device to dynamically join the second mini-hub to the digital teleconference executing on the computing device; and
based on receiving, from the computing device, second media data generated by the digital teleconference executing on the computing device, transmitting, via the first logical communication channel and the second logical communication channel, the second media data to the first wireless headset via the first mini-hub and a second wireless headset via the second mini-hub.

2. The device of claim 1, wherein the hardware processing circuitry is further configured to perform operations comprising:
based on removing the second physical connection with the second mini-hub, removing the second logical communication channel without removing the first logical communication channel.

3. The device of claim 2, wherein the second mini-hub maintains a connection with the second wireless headset in response to the second mini-hub being removed from the device.

4. The device of claim 1, wherein the first mini-hub is self-powered.

5. The device of claim 1, wherein the hardware processing circuitry is further configured to perform operations comprising:
receiving third media data from the first mini-hub via the first logical communication channel;
receiving fourth media data from the second mini-hub via the second logical communication channel;
multiplexing the third media data and the fourth media data; and
transmitting the multiplexed media data to the computing device.

6. The device of claim 1, wherein the hardware processing circuitry is further configured to perform operations comprising:
based on establishing, via a third interface of the plurality of interfaces, a third connection directly with a third wireless headset, adding a third logical communication channel between the third wireless headset and the computing device to dynamically join the third wireless headset to the digital teleconference executing on the computing device;
receiving third media data from the first mini-hub via the first logical communication channel;
receiving fourth media data from the second mini-hub via the second logical communication channel;
receiving fifth media data from the third wireless headset via the third logical communication channel;
multiplexing the third media data, the fourth media data, and the fifth media data; and
transmitting the multiplexed media data to the computing device.

7. The device of claim 1, wherein the first mini-hub is a hand-held device.

8. The device of claim 1, wherein the hardware processing circuitry is further configured to perform operations comprising:
transitioning between a first mode of operation that allows multiple audio inputs and a second mode of operation that provides only a single audio input.

9. The device of claim 1, wherein the plurality of interfaces comprises one or more physical cradles configured to physically interface with the first mini-hub.

10. The device of claim 9, wherein one or more interfaces of the plurality of interfaces are configured to implement one or more of near field communication or near-field magnetic induction communication.

11. The device of claim 9, wherein one or more interfaces of the plurality of interfaces comprises one or more of an electric contact-based interface, an inductive interface, or a wired connector interface.

12. A method comprising:
based on establishing, via a first interface of a plurality of interfaces, a first physical connection with a first mini-hub, adding a first logical communication channel between the first mini-hub and a computing device executing a digital teleconference, the first mini-hub maintaining a first wireless connection with a first wireless headset;
receiving, via the first logical communication channel between the first mini-hub and the computing device, first media data generated by the digital teleconference executing on the computing device;
transmitting, via the first logical communication channel, the first media data to the first wireless headset via the first mini-hub;
based on establishing, via a second interface of the plurality of interfaces, a second physical connection with a second mini-hub, adding a second logical communication channel between the second mini-hub and the computing device to dynamically join the second mini-hub to the digital teleconference executing on the computing device; and
based on receiving, from the computing device, second media data generated by the digital teleconference executing on the computing device, transmitting, via the first logical communication channel and the second logical communication channel, the second media data to the first wireless headset via the first mini-hub and a second wireless headset via the second mini-hub.

13. The method of claim 12, further comprising:
based on removing the second physical connection with the second mini-hub, removing the second logical communication channel without removing the first logical communication channel.

14. The method of claim 13, wherein the second mini-hub maintains a connection with the second wireless headset in response to the second mini-hub being removed from the device.

15. The method of claim 12, further comprising:
receiving third media data from the first mini-hub via the first logical communication channel;
receiving fourth media data from the second mini-hub via the second logical communication channel;
multiplexing the third media data and the fourth media data; and
transmitting the multiplexed media data to the computing device.

16. The method of claim 12, further comprising:
based on establishing, via a third interface of the plurality of interfaces, a third connection directly with a third wireless headset, adding a third logical communication channel between the third wireless headset and the computing device;
receiving third media data from the first mini-hub via the first logical communication channel;
receiving fourth media data from the second mini-hub via the second logical communication channel;
receiving fifth media data from the third wireless headset via the third logical communication channel;
multiplexing the third media data, the fourth media data, and the fifth media data; and
transmitting the multiplexed media data to the computing device.

17. The method of claim 12, further comprising:
wherein the plurality of interfaces comprises one or more physical cradles configured to physically interface with the first mini-hub.

18. The method of claim 17, wherein one or more interfaces of the plurality of interfaces are configured to implement one or more of near field communication or near-field magnetic induction communication.

19. The method of claim 17, wherein one or more interfaces of the plurality of interfaces comprises one or more of an electric contact-based interface, an inductive interface, or a wired connector interface.

20. Non-transitory computer-readable media comprising instructions that, when executed by processing circuitry, cause the processing circuitry to:
based on establishing, via a first interface of a plurality of interfaces, a first physical connection with a first mini-hub, add a first logical communication channel between the first mini-hub and a computing device executing a digital teleconference, the first mini-hub maintaining a first wireless connection with a first wireless headset;
receive, via the first logical communication channel between the first mini-hub and the computing device, first media data generated by the digital teleconference executing on the computing device;
transmit, via the first logical communication channel, the first media data to the first wireless headset via the first mini-hub;
based on establishing, via a second interface of the plurality of interfaces, a second physical connection with a second mini-hub, add a second logical communication channel between the second mini-hub and the computing device to dynamically join the second mini-hub to the digital teleconference executing on the computing device; and
based on receiving, from the computing device, second media data generated by the digital teleconference executing on the computing device, transmit, via the first logical communication channel and the second logical communication channel, the second media data to the first wireless headset via the first mini-hub and a second wireless headset via the second mini-hub.

* * * * *